United States Patent

Sterzbach

(10) Patent No.: US 12,041,471 B2
(45) Date of Patent: Jul. 16, 2024

(54) OVER-THE-AIR TESTING OF MULTIPLE MOBILE RADIO DEVICES UNDER TEST

(71) Applicant: Rohde & Schwarz GmbH & Co. KG, Munich (DE)

(72) Inventor: Bernhard Sterzbach, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 377 days.

(21) Appl. No.: 17/573,272

(22) Filed: Jan. 11, 2022

(65) Prior Publication Data

US 2023/0224733 A1 Jul. 13, 2023

(51) Int. Cl.
H04W 24/06 (2009.01)
H04W 36/00 (2009.01)

(52) U.S. Cl.
CPC ....... *H04W 24/06* (2013.01); *H04W 36/0009* (2018.08)

(58) Field of Classification Search
CPC .............................. H04W 24/06; H04W 36/00
USPC ......................... 455/438, 115.1, 115.2, 226.1
See application file for complete search history.

(56) References Cited

U.S. PATENT DOCUMENTS

| 10,728,136 B2 * | 7/2020 | Williams | .............. H04L 41/082 |
| 2012/0123723 A1 | 5/2012 | El-Hassan et al. | |
| 2012/0221277 A1 | 8/2012 | Gregg et al. | |
| 2012/0231744 A1 | 9/2012 | Gregg et al. | |
| 2012/0231745 A1 | 9/2012 | Gregg et al. | |
| 2013/0211770 A1 | 8/2013 | Dresler et al. | |
| 2015/0244477 A1 | 8/2015 | Hirst et al. | |
| 2018/0287926 A1 * | 10/2018 | Williams | .............. H04L 41/082 |
| 2019/0187199 A1 * | 6/2019 | Mellein | .................. H04B 17/29 |
| 2019/0246345 A1 | 8/2019 | Murthy et al. | |

* cited by examiner

*Primary Examiner* — David Q Nguyen
(74) *Attorney, Agent, or Firm* — DITTHAVONG, STEINER & MLOTKOWSKI

(57) ABSTRACT

Disclosed is a method of operating a test system for over-the-air, OTA, testing of at least two mobile devices under test, DUTs. The at least two mobile DUTs have respective mobile subscriber identities, IMSIs. The method comprises simulating, by a mobile radio cell simulator connectable to the test system, a first mobile radio cell being open for attachment by all of said mobile DUTs, and attaching all of said mobile DUTs to the first mobile radio cell. The method further comprises simulating, by a mobile radio tester connectable to the test system, a second mobile radio cell being barred for attachment by said mobile DUTs. The method further comprises prompting, by the mobile radio cell simulator, one particular DUT of said mobile DUTs to perform a handover to the second mobile radio cell. The method further comprises subjecting, by the mobile radio tester, the particular DUT to an OTA test procedure within the second mobile radio cell. The method further comprises prompting, by the mobile radio tester, the particular DUT to leave the second mobile radio cell. The method further comprises indicating a status of the particular DUT subjected to the OTA test procedure.

20 Claims, 2 Drawing Sheets

OVER-THE-AIR TESTING OF MULTIPLE MOBILE RADIO DEVICES UNDER TEST

TECHNICAL FIELD

The present disclosure relates to testing of mobile radio devices, and in particular to a method of operating a test system for over-the-air (OTA), testing of a plurality of mobile radio devices under test (DUTs).

BACKGROUND ART

Upon manufacture or service/repair, a plurality of mobile radio devices may need to be tested efficiently. In such a scenario, a use of multiple independent test setups is expensive and time consuming, whereas cabled testing using radio-frequency, RF, multiplexers is not feasible for a higher number of radio channels.

SUMMARY OF THE INVENTION

In view of the above-mentioned drawbacks and limitations, the present disclosure aims to improve testing of mobile radio devices.

The objective is achieved by the embodiments as defined by the appended independent claims. Preferred embodiments are set forth in the dependent claims and in the following description and drawings.

One aspect of the present disclosure relates to a method of operating a test system for over-the-air, OTA, testing of at least two mobile devices under test, DUTs. The at least two mobile DUTs have respective mobile subscriber identities, IMSIs. The method comprises simulating, by a mobile radio cell simulator connectable to the test system, a first mobile radio cell being open for attachment by all of said mobile DUTs, and attaching all of said mobile DUTs to the first mobile radio cell; simulating, by a mobile radio tester connectable to the test system, a second mobile radio cell being barred for attachment by said mobile DUTs; prompting, by the mobile radio cell simulator, one particular DUT of said mobile DUTs to perform a handover to the second mobile radio cell; subjecting, by the mobile radio tester, the particular DUT to an OTA test procedure within the second mobile radio cell; prompting, by the mobile radio tester, the particular DUT to leave the second mobile radio cell; and indicating a status of the particular DUT subjected to the OTA test procedure.

The method may further comprise repeating the OTA testing for every other DUT of the at least two mobile DUTs.

The simulation of the second mobile radio cell may comprise simulating the second mobile radio cell in a second frequency band different from a first frequency band of the first mobile radio cell.

The prompting of the particular DUT to leave the second mobile radio cell may comprise one or more of: detaching from any mobile radio cell; returning to the first mobile radio cell; and enforcing an offline radio mode.

The indication of the status of the particular DUT may comprise displaying the status of the particular DUT.

The method may further comprise generating a detailed test report for the particular DUT subjected to the OTA test procedure.

The method may further comprise moving, by the mobile radio cell simulator, the first mobile radio cell to a third frequency band different from the first frequency band; and prompting, by the mobile radio cell simulator, each attached DUT of the at least two DUTs to perform a handover to the moved mobile radio cell.

The method may further comprise prompting, by the mobile radio cell simulator, each attached DUT of the at least two DUTs to refrain from radio transmission; and refraining, by the mobile radio cell simulator, from radio transmission for a predefined period.

The prompting of each attached DUT of the at least two DUTs to refrain from radio transmission may comprise synchronizing discontinuous reception, DRX, intervals of each attached DUT of the at least two DUTs.

The method may further comprise detecting, by a controller of the test system, a transmission failure of a specific DUT of the at least two DUTs; and remedying the transmission failure of the specific DUT.

The remedying of the transmission failure of the specific DUT may comprise one or more of: suspending, by the controller, the OTA test procedure if the specific DUT and the particular DUT are the same; deactivating, by the controller, the specific DUT; and prompting, by the controller, a removal of the specific DUT from the test system.

The test system may comprise a DUT receptacle including at least two DUT arrangement positions, respectively comprising a transmission detector including a broadband antenna; a plurality of testing antennas, being connectable to the mobile radio tester; and a signalling antenna, being connectable to the mobile radio cell simulator.

The test system may further comprise a shielding member enclosing the test system.

The method may further comprise detecting, by the at least two transmission detectors, a DUT arrangement position of the respective DUT on the DUT receptacle during attachment to the first mobile radio cell.

The detection of the DUT arrangement position of the respective DUT on the DUT receptacle during attachment to the first mobile radio cell may comprise verifying, by the controller, whether the mobile subscriber identity, IMSI, of the respective DUT, a mobile device identity, IMEI, of the respective DUT, and the DUT arrangement position of the respective DUT relate to an assigned DUT arrangement position.

The method may further comprise setting, by the controller, calibration values of the second mobile radio cell in accordance with a device type and/or the DUT arrangement position of the particular DUT.

Each of the at least two DUT arrangement positions may further comprise a holder for the respective DUT.

Each of the at least two DUT arrangement positions may further comprise an indicator for a status of the respective DUT.

Each of the at least two DUT arrangement positions may further comprise a display for the status of the respective DUT.

Each of the at least two DUT arrangement positions may further comprise a power and control connection for the respective DUT.

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
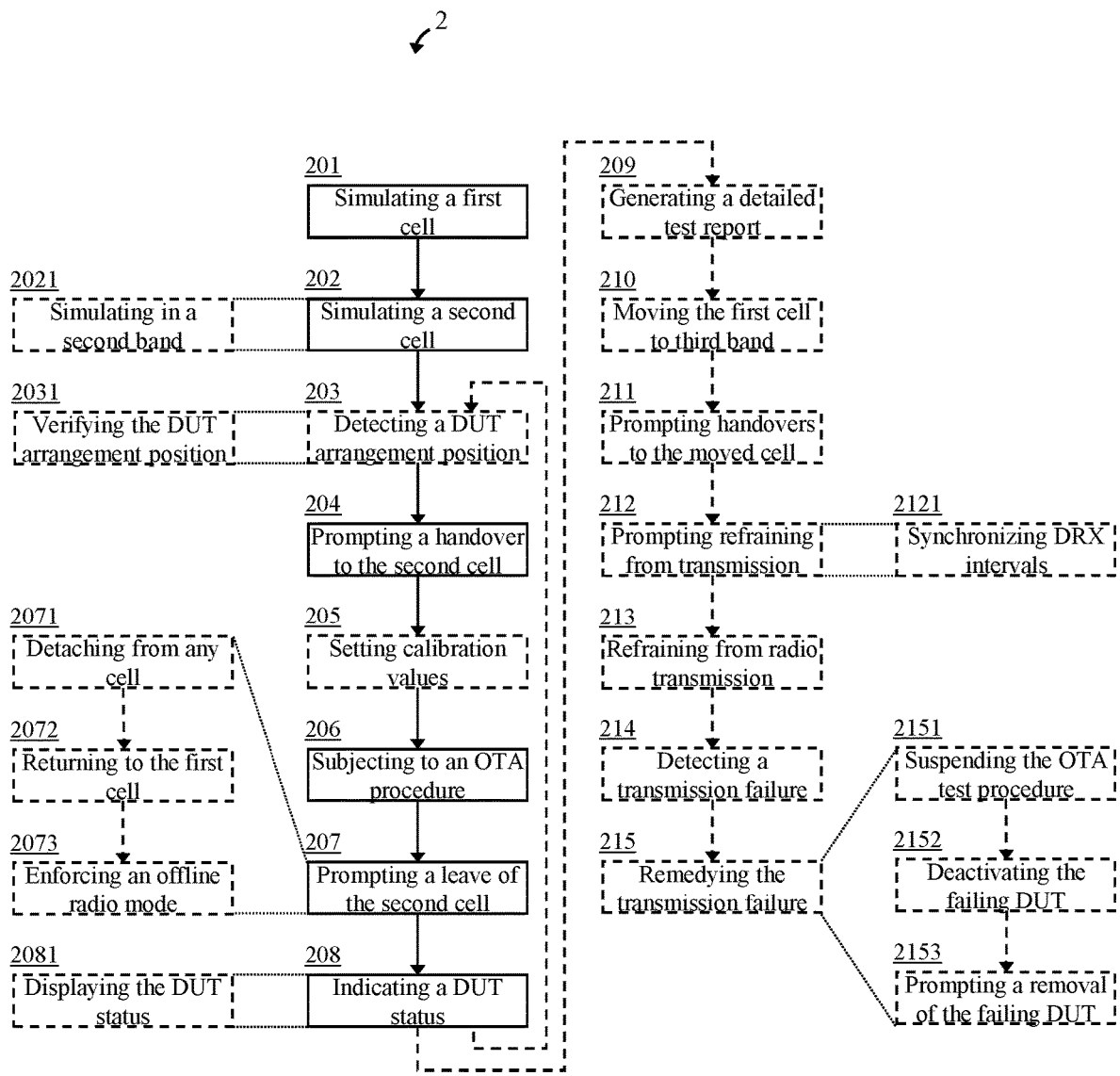

The drawings are to be regarded as being schematic representations, and elements illustrated in the drawings are not necessarily shown to scale. Rather, the various elements are represented such that their function and general purpose become apparent to those skilled in the art.

FIG. 1 illustrates a method in accordance with the present disclosure; and

Figure 2:
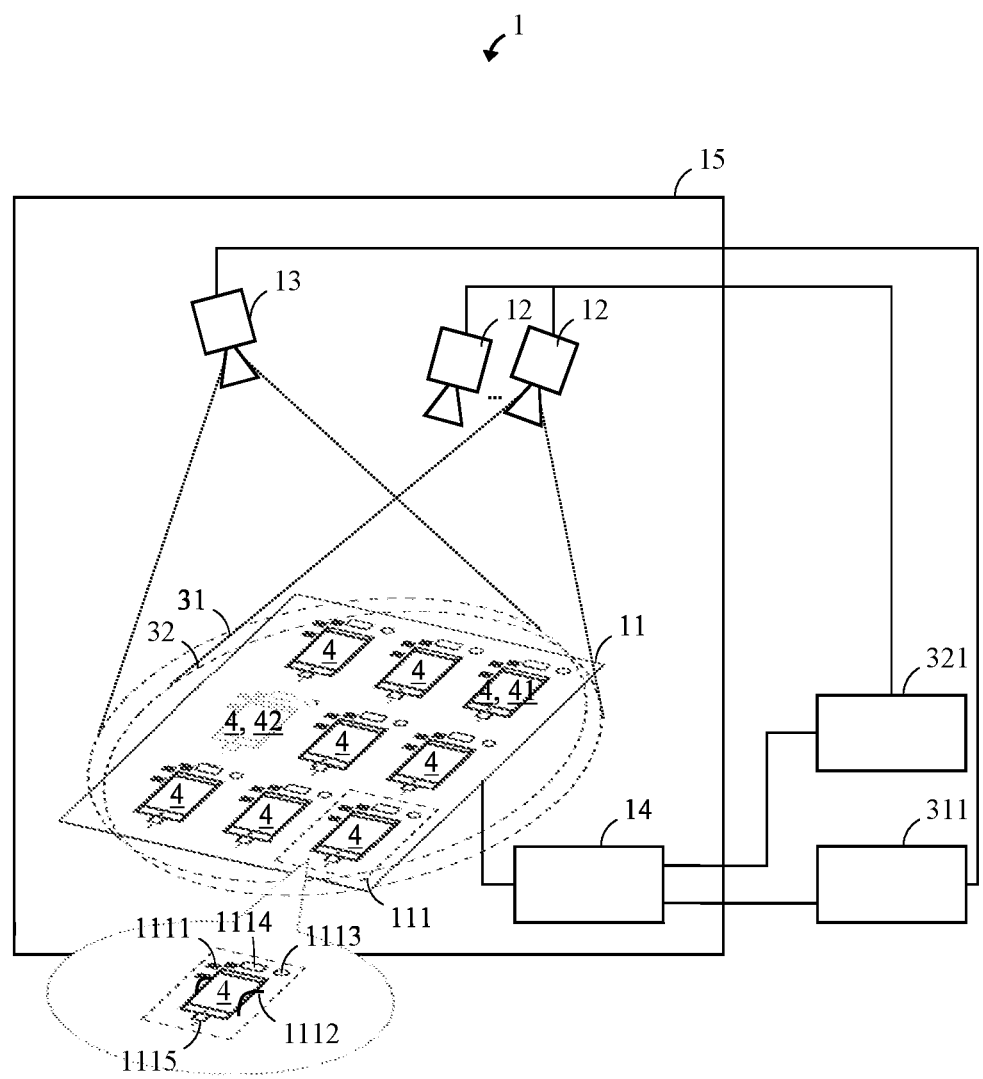

FIG. 2 illustrates a test system in accordance with the present disclosure.

DETAILED DESCRIPTIONS OF EMBODIMENTS

FIG. 1 illustrates a method 2 for operating a test system 1 for over-the-air, OTA, testing of at least two mobile devices under test, DUTs 4.

A mobile device as used herein may refer to a portable or handheld electronic equipment having cellular communication functionality, such as a smartphone or phablet, a mobile computer such as a personal digital assistant, tablet computer or laptop computer, a wearable computer such as a smart watch, and the like.

Over-the-air (OTA) as used herein may be used as a synonym for the terms 'wireless' or 'radio'. OTA testing as used herein may refer to testing of protocol functionality of an air interface (i.e., the LTE-Uu interface in 4G/LTE networks, and the NR-Uu interface in 5G/NR networks) that connects mobile devices (i.e., user equipments, UEs) and base stations (i.e., eNodeBs in 4G/LTE, and gNodeBs in 5G/NR). As such, OTA testing may be based on 3GPP-standardized radio channels.

A device under test (DUT) as used herein may refer to a device undergoing testing, either at first manufacture or later-on during its life cycle, for example after service/repair to establish that the device performs in accordance with its original specification.

According to FIG. 2, the test system 1 may comprise a DUT receptacle 11 designed for holding a DUT, especially a handheld DUT, in a defined position and/or orientation.

A receptacle as used herein may refer to a support structure.

In particular, the DUT receptacle 11 may be plate-shaped.

A plate as used herein may refer to a flat piece of material.

The DUT receptacle 11 may include at least two DUT arrangement positions 111 (one of them being suggested by a dashed rectangle).

In accordance with FIG. 2, each of the at least two DUT arrangement positions respectively comprises a transmission detector 1111.

A transmission detector as used herein may refer to an electric circuit for detecting a radio communication emanating from a mobile DUT 4 at a particular DUT arrangement position.

Each transmission detector 1111 may comprise a broadband antenna.

A broadband antenna as used herein may refer to an antenna structure designed for efficient radio communication over an extensive radio frequency (RF) spectrum, such as frequency bands used for cellular communications, for example.

As is best seen in the speech bubble inset of FIG. 2, each of the at least two DUT arrangement positions may further comprise one or more of: a holder 1112 for the respective DUT 4, an indicator 1113 for a status of the respective DUT 4; a display 1114 for the status of the respective DUT 4; and a power and control connection 1115 for the respective DUT 4.

A holder as used herein may refer to mechanical means designed for retaining the respective DUT at its DUT arrangement position. For example, the holder may comprise a recess in the DUT receptable 11, one or more stop members, one or more clamping members, and the like.

An indicator as used herein may refer to a luminous member designed for on-off operation so as to catch an attention of a user/operator.

A display as used herein may refer to an output device designed for presenting visual information to the user/operator.

The test system 1 may further comprise a plurality of testing antennas 12, being connectable to the mobile radio tester 321.

An antenna as used herein may generally refer to a waveguide structure designed for conversion between waveguide-bound communication and radio communication, in both directions. One example of a directable antenna is a phased array antenna configured for electronic steering. Another example of a directable antenna is a horn antenna configured for electro-mechanical steering.

A mobile radio tester as used herein may refer to test equipment designed for testing conformity of a radio device with applicable standards for an air interface of a cellular network.

The test system 1 may further comprise a signalling antenna 13, being connectable to a mobile radio cell simulator 311.

A cell as used herein may refer to a portion of a total geographic coverage of the cellular network being served by at least one fixed-location transceiver (i.e., base station) using cell-specific time-frequency resources. A cell may overlap with adjacent cells using different cell-specific time-frequency resources so as to enable seamless handovers between the cells.

A mobile radio cell simulator as used herein may refer to test equipment designed for model-based imitation of an operation of a base station of the cellular network.

The plurality of testing antennas 12 and the signalling antenna 13 may respectively be directable at the at least two DUT arrangement positions.

The test system 1 may further comprise a controller 14 of the test system 1 and the connectable devices 311, 321. The controller may be connected to the DUT receptable 11 for sensing an occupation of the plurality of DUT arrangement positions 111 with DUTs 4, and to the mobile radio cell simulator 311 as well as the mobile radio tester 321 to control a process flow of the method 2 explained in more detail below.

The test system 1 may further comprise a shielding member 15 enclosing the test system 1. Depending on the implementation, the controller 14 may or may not be enclosed by the shielding member 15.

Shielding as used herein may refer to reducing or blocking undesirable electromagnetic fields using electrically conductive or magnetically permeable materials.

The at least two mobile DUTs 4 have respective mobile subscriber identities, IMSIs.

The respective IMSI may be provided by one of: an inserted SIM, and a programmed eSIM.

A mobile subscriber identity as used herein may refer to a unique identifier of a user of a communications network, in particular of the afore-mentioned cellular network.

An international mobile subscriber identity (IMSI) as used herein may refer to a mobile subscriber identity in conformity with the international identification plan for public networks and subscriptions (ITU-T E.212).

A subscriber identity (or identification) module (SIM) as used herein may refer to an integrated circuit used to securely store the mobile subscriber identity. A mobile device may be provided with a mobile subscriber identity by inserting a SIM.

An embedded SIM (eSIM) as used herein, also known as embedded universal integrated circuit card (eUICC), may refer to a programmable SIM being embedded directly into a device. Such a mobile device may be provided with a mobile subscriber identity by programming the device's eSIM.

After being provided with respective mobile subscriber identities, the plurality of mobile radio DUTs 4 may be placed at free DUT arrangement positions 111 of the test system 1 (see FIG. 2) for testing.

According to FIG. 1, the method 2 comprises simulating 201, by a mobile radio cell simulator 311 connectable to the test system 1, a first mobile radio cell 31 being open for attachment by all of said mobile DUTs 4, and attaching all of said mobile DUTs 4 to the first mobile radio cell 31.

In other words, the mobile radio cell simulator 311 (i.e., a base station simulator) may be used to provide the first mobile radio cell 31 which is accessible from all DUT arrangement positions 111. By performing its normal cell search algorithm, each DUT 4 may find the first mobile radio cell 31 and perform an attach procedure. During this procedure the respective DUT 4 and preferably all DUTs 4 present register(s) with the first mobile radio cell 31 with its IMSI and its IMEI.

The method 2 further comprises simulating 202, by a mobile radio tester 321 connectable to the test system 1, a second mobile radio cell 32 being initially barred for attachment by said mobile DUTs 4.

In particular, the first mobile radio cell 31 and the second mobile radio cell 32 may form part of a same cellular test network 31, 32.

The simulation 202 of the second mobile radio cell 32 may comprise simulating 2021 the second mobile radio cell 32 in a second frequency band different from a first frequency band of the first mobile radio cell 31.

The method may further comprise detecting 203, by the at least two transmission detectors 1111, a DUT arrangement position of the respective DUT 4 on the DUT receptacle 11 during attachment to the first mobile radio cell 31.

Transmissions from a respective DUT 4 may thus be detected by the transmission detector 1111 at the particular DUT arrangement position 111. By observing a temporal correlation of a registration/attachment procedure and the detected transmissions during the registration/attachment, the controller 14 of the test system 1 may determine the DUT arrangement position 111 from which a new DUT 4 has registered/attached.

The detection 203 of the DUT arrangement position of the respective DUT 4 on the DUT receptacle 11 during attachment to the first mobile radio cell 31 may comprise verifying 2031, by the controller 14, whether the mobile subscriber identity, IMSI, of the respective DUT 4, a mobile device identity, IMEI, of the respective DUT 4, and the DUT arrangement position of the respective DUT 4 relate to an assigned DUT arrangement position.

One by one, the registered/attached DUTs 4 may now be tested in accordance with the following sequence 204-208.

The method 2 further comprises prompting 204, by the mobile radio cell simulator 311, one particular DUT 41 of said mobile DUTs 4 to perform a handover to the second mobile radio cell 32. The handover may particularly comprise a blind handover. All other DUTs 4 will remain attached to the first mobile radio cell 31.

A blind handover or redirection may refer to a process wherein a base station instructs a mobile device to attach to a certain target cell without requiring the mobile device to perform radio measurements or report corresponding measurement results.

The method may further comprise setting 205, by the controller 14, calibration values of the second mobile radio cell 32 in accordance with a device type and/or the DUT arrangement position of the particular DUT 41. For example, calibration values such as radio path length and attenuation may be set to values pertaining to a DUT arrangement position 111 and the device type of the particular DUT 41. In this connection, the second mobile radio cell 32 may be a calibrated measurement cell having a calibrated antenna, calibrated cabling, calibrated measurement instruments and the like.

As a result, the second mobile radio cell 32 is calibrated for measurement with regard to the DUT arrangement position 111—and potentially also with respect to the device type—of the particular DUT 41.

The method 2 further comprises subjecting 206, by the mobile radio tester 321, the particular DUT 41 to an OTA test procedure within the second mobile radio cell 32.

The method 2 further comprises prompting 207, by the mobile radio tester 321, the particular DUT 41 to leave the second mobile radio cell 32 after conclusion of the OTA test procedure.

The prompting 207 of the particular DUT 41 to leave the second mobile radio cell 32 may comprise one or more of: detaching 2071 from any mobile radio cell 31, 32; optionally returning 2072 to the first mobile radio cell 31; and enforcing 2073 an offline radio mode onto the particular DUT 41.

The method 2 further comprises indicating 208 a status of the particular DUT 41 subjected to the OTA test procedure.

The indication 208 of the status of the particular DUT 41 may comprise displaying 2081 the status of the particular DUT 41.

As such, when OTA testing is completed, the indicator 1113 and/or the display 1114 next to it may show a status and/or a test result of the respective DUT 41, which can be automatically or manually removed from the test system 1.

As indicated by the dashed arrow originating at step 208 and terminating at step 203, the method 2 may further comprise repeating the OTA testing for every other DUT of the at least two mobile DUTs 4.

Thereby, testing of mobile radio devices is improved in that (i) expensive test equipment is used continuously and therefore efficiently, (ii) there's no waiting for the user/operator, and no waiting for cell search by having all DUTs first "parked" by attachment with the first mobile radio cell, and (iii) the test system may efficiently be shared among multiple users/operators.

As can be taken from the second column of method steps in FIG. 1, the method 2 may further comprise generating 209 a detailed test report for the particular DUT 41 subjected to the OTA test procedure.

If the mobile radio tester 321 needs to perform an OTA test procedure on the first frequency band of the first mobile radio cell 31, the controller 14 may prompt the mobile radio cell simulator 311 to "move" its first mobile radio cell 31 to another frequency band and to perform a suitable handover procedure with all attached DUTs 4.

That is to say, the method 2 may further comprise moving 210, by the mobile radio cell simulator 311, the first mobile radio cell 31 to a third frequency band different from the first frequency band; and prompting 211, by the mobile radio cell simulator 311, each attached DUT of the at least two DUTs 4 to perform a handover to the moved mobile radio cell 32.

If the mobile radio tester 321 needs "radio silence" during an OTA test procedure, the controller 14 may prompt the mobile radio cell simulator 311 to perform suitable signaling procedures (e.g. synchronization of DRX intervals of the attached DUTs 4) to stop any other DUTs 4 from transmitting and to shut down its own signal for a predefined time period.

That is to say, the method 2 may further comprise prompting 212, by the mobile radio cell simulator 311, each attached DUT of the at least two DUTs 4 to refrain from radio transmission; and refraining 213, by the mobile radio cell simulator 311, from radio transmission for a predefined period.

The prompting 212 of each attached DUT of the at least two DUTs 4 to refrain from radio transmission may comprise synchronizing 2121 discontinuous reception, DRX, intervals of each attached DUT of the at least two DUTs 4.

In rare cases, a defective DUT 4 may transmit out of band or at the wrong time and thus disturb OTA testing of other DUTs 4. This behavior may be detected by means of the transmission detector 1111 co-located with the defective DUT 4.

As such, the method 2 may further comprise detecting 214, by the controller 14 of the test system 1, a transmission failure of a specific DUT 42 of the at least two DUTs 4; and remedying 215 the transmission failure of the specific DUT 42.

The remedying 215 of the transmission failure of the specific DUT 42 may comprise one or more of: suspending 2151, by the controller 14, the OTA test procedure if the specific DUT 42 and the particular DUT 41 are the same; deactivating 2152, by the controller 14, the specific DUT 42; and prompting 2153, by the controller 14, a removal of the specific DUT 42 from the test system 1.

Of note, the optional method steps 209-215 indicated in FIG. 1 by dashed lines not necessarily have to be performed in accordance with the sequence depicted in FIG. 1. For example, the method portions 209, 210-211, 212-213, and 214-215 may be performed independently of one another.

The invention claimed is:

1. A method of operating a test system for over-the-air, OTA, testing of at least two mobile devices under test, DUTs, having respective mobile subscriber identities, IMSIs,
the method comprising
simulating, by a mobile radio cell simulator connectable to the test system, a first mobile radio cell being open for attachment by all of said mobile DUTs, and attaching all of said mobile DUTs to the first mobile radio cell;
simulating, by a mobile radio tester connectable to the test system, a second mobile radio cell being barred for attachment by said mobile DUTs;
prompting, by the mobile radio cell simulator, one particular DUT of said mobile DUTs to perform a handover to the second mobile radio cell;
subjecting, by the mobile radio tester, the particular DUT to an OTA test procedure within the second mobile radio cell;
prompting, by the mobile radio tester, the particular DUT to leave the second mobile radio cell; and
indicating a status of the particular DUT subjected to the OTA test procedure.

2. The method of claim 1,
repeating the OTA testing for every other DUT of the at least two mobile DUTs.

3. The method of claim 1,
the simulation of the second mobile radio cell comprising
simulating the second mobile radio cell in a second frequency band different from a first frequency band of the first mobile radio cell.

4. The method of claim 1,
the prompting of the particular DUT to leave the second mobile radio cell comprising one or more of:
detaching from any mobile radio cell;
returning to the first mobile radio cell; and
enforcing an offline radio mode.

5. The method of claim 1,
the indication of the status of the particular DUT comprising
displaying the status of the particular DUT.

6. The method of claim 1, further comprising
generating a detailed test report for the particular DUT subjected to the OTA test procedure.

7. The method of claim 1, further comprising
moving, by the mobile radio cell simulator, the first mobile radio cell to a third frequency band different from the first frequency band; and
prompting, by the mobile radio cell simulator, each attached DUT of the at least two DUTs to perform a handover to the moved mobile radio cell.

8. The method of claim 1, further comprising
prompting, by the mobile radio cell simulator, each attached DUT of the at least two DUTs to refrain from radio transmission; and
refraining, by the mobile radio cell simulator, from radio transmission for a predefined period.

9. The method of claim 8,
the prompting of each attached DUT of the at least two DUTs to refrain from radio transmission comprising
synchronizing discontinuous reception, DRX, intervals of each attached DUT of the at least two DUTs.

10. The method of claim 1, further comprising
detecting, by a controller of the test system, a transmission failure of a specific DUT of the at least two DUTs; and
remedying the transmission failure of the specific DUT.

11. The method of claim 10,
the remedying of the transmission failure of the specific DUT comprising one or more of:
suspending, by the controller, the OTA test procedure if the specific DUT and the particular DUT are the same;
deactivating, by the controller, the specific DUT; and
prompting, by the controller, a removal of the specific DUT from the test system.

12. The method of claim 1,
the test system comprising
a DUT receptacle including at least two DUT arrangement positions, respectively comprising a transmission detector including a broadband antenna;
a plurality of testing antennas, being connectable to the mobile radio tester; and
a signalling antenna, being connectable to the mobile radio cell simulator.

13. The method of claim 12,
the test system further comprising
a shielding member enclosing the test system.

14. The method of claim 12, further comprising detecting, by the at least two transmission detectors, a DUT arrangement position of the respective DUT on the DUT receptacle during attachment to the first mobile radio cell.

15. The method of claim 14, the detection of the DUT arrangement position of the respective DUT on the DUT receptacle during attachment to the first mobile radio cell comprising
verifying, by the controller, whether the mobile subscriber identity, IMSI, of the respective DUT, a mobile device identity, IMEI, of the respective DUT, and the DUT arrangement position of the respective DUT relate to an assigned DUT arrangement position.

16. The method of claim 14, further comprising setting, by the controller, calibration values of the second mobile radio cell in accordance with a device type and/or the DUT arrangement position of the particular DUT.

17. The method of claim 12, each of the at least two DUT arrangement positions further comprising a holder for the respective DUT.

18. The method of claim 12, each of the at least two DUT arrangement positions further comprising an indicator for a status of the respective DUT.

19. The method of claim 12, each of the at least two DUT arrangement positions further comprising a display for the status of the respective DUT.

20. The method of claim 12, each of the at least two DUT arrangement positions further comprising a power and control connection for the respective DUT.

\* \* \* \* \*